(12) United States Patent
Kuo

(10) Patent No.: US 9,221,199 B2
(45) Date of Patent: Dec. 29, 2015

(54) METHOD TO MANUFACTURE CUSHION COMPOSITE STRUCTURE AND CUSHION COMPOSITE STRUCTURE MANUFACTURED BY THE SAME

(71) Applicant: Chun-Fu Kuo, Taichung (TW)

(72) Inventor: Chun-Fu Kuo, Taichung (TW)

( * ) Notice: Subject to any disclaimer, the term of this patent is extended or adjusted under 35 U.S.C. 154(b) by 151 days.

(21) Appl. No.: 13/804,105

(22) Filed: Mar. 14, 2013

(65) Prior Publication Data

US 2014/0272253 A1 Sep. 18, 2014

(51) Int. Cl.
| | |
|---|---|
| *B32B 37/00* | (2006.01) |
| *B29C 41/04* | (2006.01) |
| *B29C 44/12* | (2006.01) |
| *B29C 44/58* | (2006.01) |
| B29L 31/00 | (2006.01) |
| B29C 33/12 | (2006.01) |

(52) U.S. Cl.
CPC ............. *B29C 41/04* (2013.01); *B29C 44/1271* (2013.01); *B29C 44/1285* (2013.01); *B29C 44/583* (2013.01); *B29C 33/12* (2013.01); *B29C 41/042* (2013.01); *B29L 2031/751* (2013.01); *Y10T 428/233* (2015.01); *Y10T 428/239* (2015.01)

(58) Field of Classification Search
USPC ................................................ 264/45.1, 45.7
See application file for complete search history.

(56) References Cited

U.S. PATENT DOCUMENTS

| | | | |
|---|---|---|---|
| 2006/0061001 A1* | 3/2006 | Wamshuis et al. | ........... 264/45.5 |
| 2008/0184514 A1* | 8/2008 | Martini | ......................... 15/244.4 |

* cited by examiner

*Primary Examiner* — Stella Yi

(57) ABSTRACT

A method to manufacture cushion composite structure utilizes a mold including a first mold body and a second mold body wherein at least one thereof forms a mold room. The method includes the following steps: injecting foam material into the mold room, placing a compressible core into the mold room, closing the mold, rotating the mold and foaming the foam material to fill up the mold room, and removing the mold to form the cushion composite structure. Thereby, the core is embedded in the foam material at a predetermined position, and parting line on surface of the cushion composite structure is prevented.

7 Claims, 6 Drawing Sheets

METHOD TO MANUFACTURE CUSHION COMPOSITE STRUCTURE AND CUSHION COMPOSITE STRUCTURE MANUFACTURED BY THE SAME

BACKGROUND OF THE INVENTION

1. Field of the Invention

The present invention relates to a method to manufacture cushion composite structure and a cushion composite structure manufactured by the method.

2. Description of the Prior Art

A conventional foamed memory cushion is disclosed in U.S. Pat. No. 7,444,700. Foam material such as PU is injected into a mold, and the mold is heated to foam the foam material. The foamed foam material expands and fills up the mold to form a cushion having the same shape with the mold.

However, if the whole cushion is made of memory foam material, support is insufficient, and weight can not be reduced. Also, cost is high.

To improve, a cushion having a core made of a different material is provided in prior arts. The core can provide better support. However, the foam material is flowable, so the core may be brought to move by the foam material in the mold. When foaming, the core may be pushed onto inner surface of the mold. Thus, position of the core is difficult to adjust, and the core is impossible to be positioned at a desired position in the foam material. Besides, the foam material is difficult to wrap the core evenly due to gravity.

SUMMARY OF THE INVENTION

The main object of the present invention is to provide a method to manufacture cushion composite structure and a cushion composite structure manufactured by the method.

To achieve the above and other objects, a method to manufacture cushion composite structure of the present invention utilizes a mold including a first mold body and a second mold body wherein at least one of the first mold body and the second mold body forms a mold room. The method includes the following steps.

I. Foam material is injected into the mold room wherein volume of the foam material is equal to or smaller than volume of the mold room.

II. A compressible core is placed into the mold room wherein the core is shaped in advance and has a predetermined shape.

III. The first mold body and the second mold body are closed to each other so that the mold room is closed.

IV. The mold is rotated along a rotation axle on the mold, and the foam material is foamed and expanded to wrap the core and to fill up the mold room.

V. The first mold body and the second mold body are removed, and the cushion composite structure is formed.

The cushion composite structure manufactured by the method includes the core and a foam layer. The core is embedded in the foam layer, and the foam layer is shaped from the foam material.

Thereby, during process of foaming, the core can be positioned at a predetermined position in the foam material so as to be evenly wrapped by the foam material. The outer foam layer is made of memory material, and the inner core provides better support and reduces weight. Besides, the core is made of compressible material so as to allow being squeezed inward slightly when the foam material is foamed. Thus, the foam material may not overflow into gap between the two mold bodies so that parting lines on surface of the cushion composite structure is prevented.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 1 is an illustration showing that a core is placed and that foam material is injected in;

DETAILED DESCRIPTION OF THE PREFERRED EMBODIMENTS

Please refer to FIG. 1 to FIG. 4. The method to manufacture cushion composite structure of the present invention utilizes a mold 1 including a first mold body 11 and a second mold body 12 wherein at least one of the first mold body 11 and the second mold body 12 forms a mold room 111, 121. In the present embodiment, each of the first mold body 11 and the second mold body 12 forms a mold room 111, 121. However, it is feasible that one of the first mold body and the second mold body forms a mold room, and that the other one of the first mold body and the second mold body is formed with a flat surface. The method includes the following steps.

Figure 1:
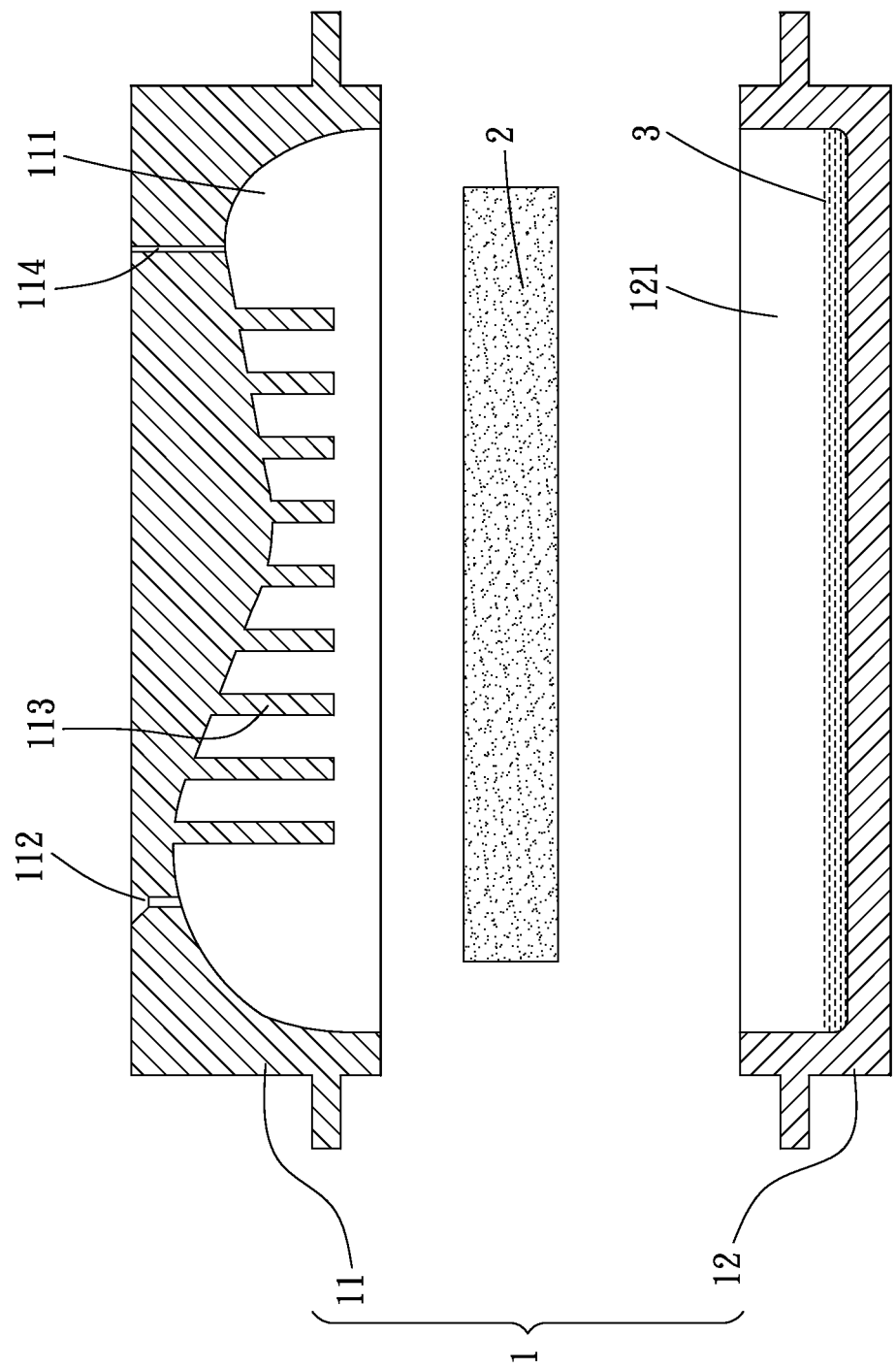

First, a foam material 3 is injected into the mold room 121 of the second mold body wherein volume of the foam material 3 is equal to or smaller than volume of the mold room 121, as shown in FIG. 1. In the present embodiment, volume of the foam material 3 injected into the mold room 121 is substantially a tenth of total volume of the two mold rooms 111, 121. Preferably, the foam material 3 is natural latex or artificial latex. More preferably, the foam material 3 is unfoamed polyurethane (PU).

Second, a compressible core 2 is placed into the mold room 121 of the second mold body so that the core 2 floats upon the foam material 3 in the mold room 121, as shown in FIG. 1. Specifically, the core 2 is shaped in advance to have a predetermined shape. In the present embodiment, the core 2 is a shaped sponge article. However, other compressible material is able to be introduced as the core in other possible embodiments.

Figure 2:
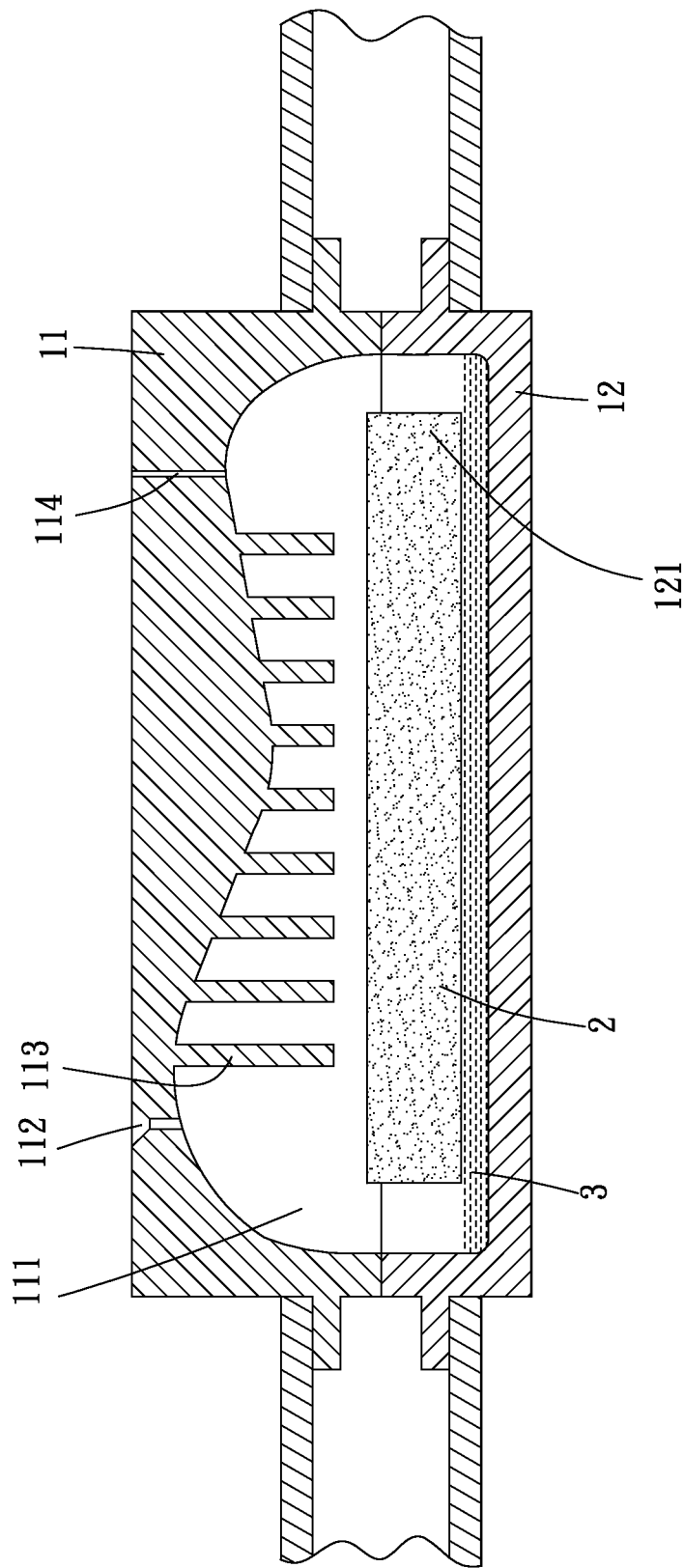
FIG. 2 is an illustration showing that a mold is closed.

Third, the first mold body 11 is closed to the second mold body 12 so that the two mold rooms 111, 121 communicate with each other, as shown in FIG. 2. The mold rooms 111, 121 are closed, and the core 2 is movable in the two mold rooms 111, 121.

Figure 3:
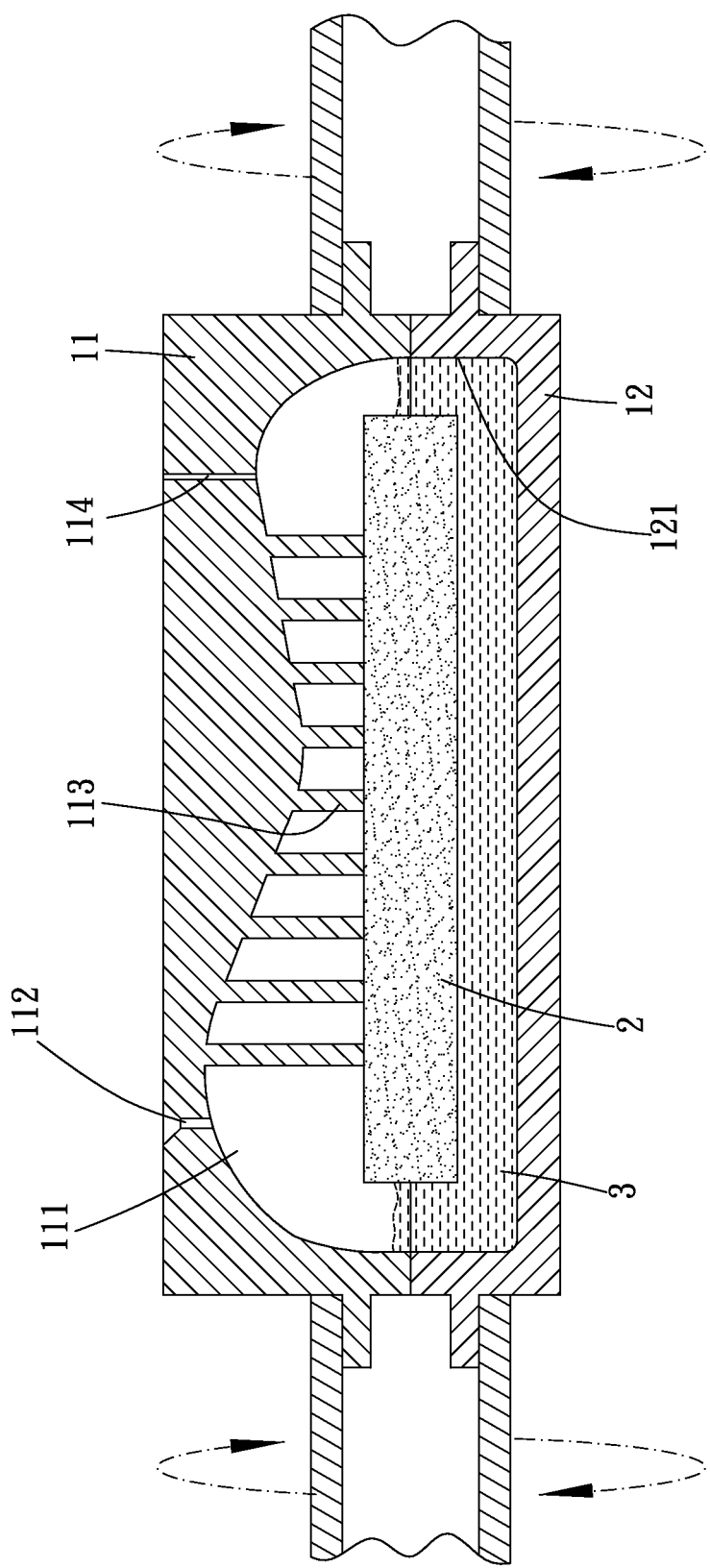
FIGS. 3 and 4 are illustrations showing process of rotating and foaming.
Figure 4:
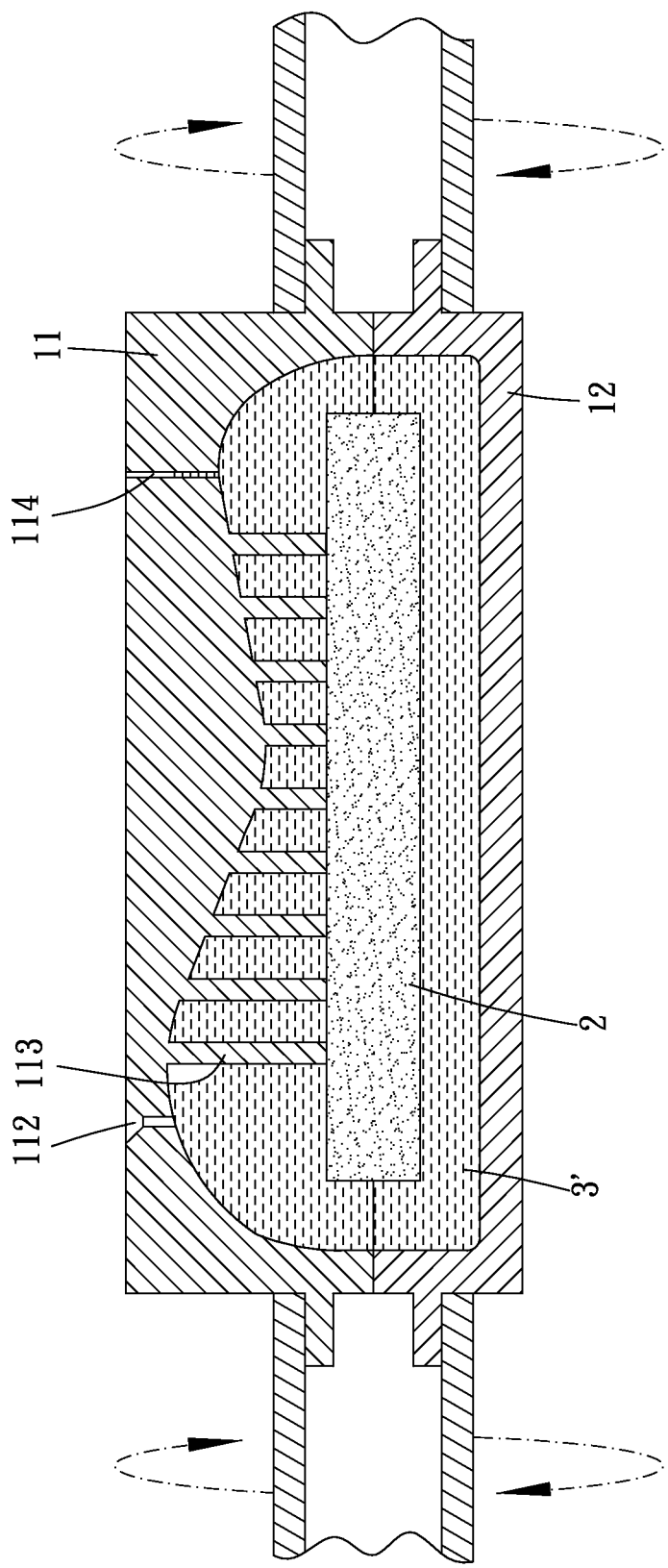

Fourth, the mold is rotated by a rotation axle. During rotation, the foam material 3 is foamed and expanded at a predetermined temperature to wrap the core 2 and to fill up the two mold rooms 111, 121, as shown in FIGS. 3 and 4. By rotating the mold continuously, the core 2 is maintained at substantially center of the mold, and foam material 3 may flow and be distributed over the core 2 more easily. Optionally, frequency and direction of rotation can be regulated to adjust position of the core. Preferably, at least one of the first mold body and the second mold body forms a plurality of protruding support structures 113 on a face facing the other of the first mold body and the second mold body. The support structures 113 are arranged spacedly. During process of foaming of the foam material, the core 2 is prevented from being pushed to contact the mold body having the support structures due to the support structures 13. Thereby, the core 2 can be evenly wrapped by the foam material 3. More preferably, each support structure 113 is rod-shaped, and the support structures 113 are arranged parallelly.

Figure 5:
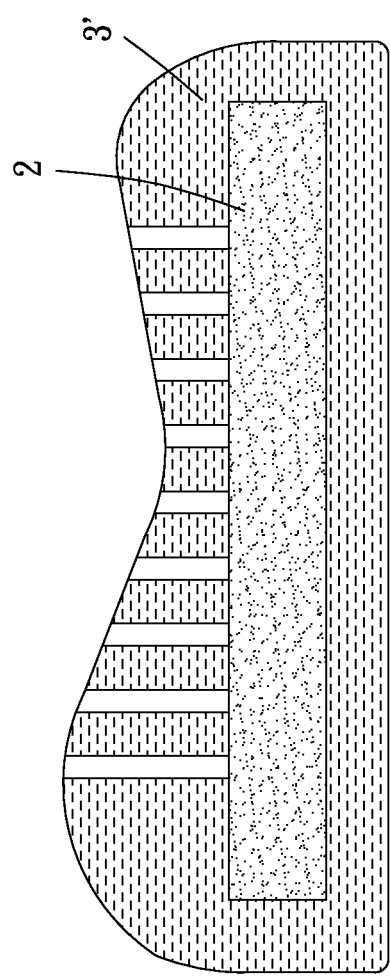
FIG. 5 is a profile showing a cushion composite structure of the present invention.
Figure 6:
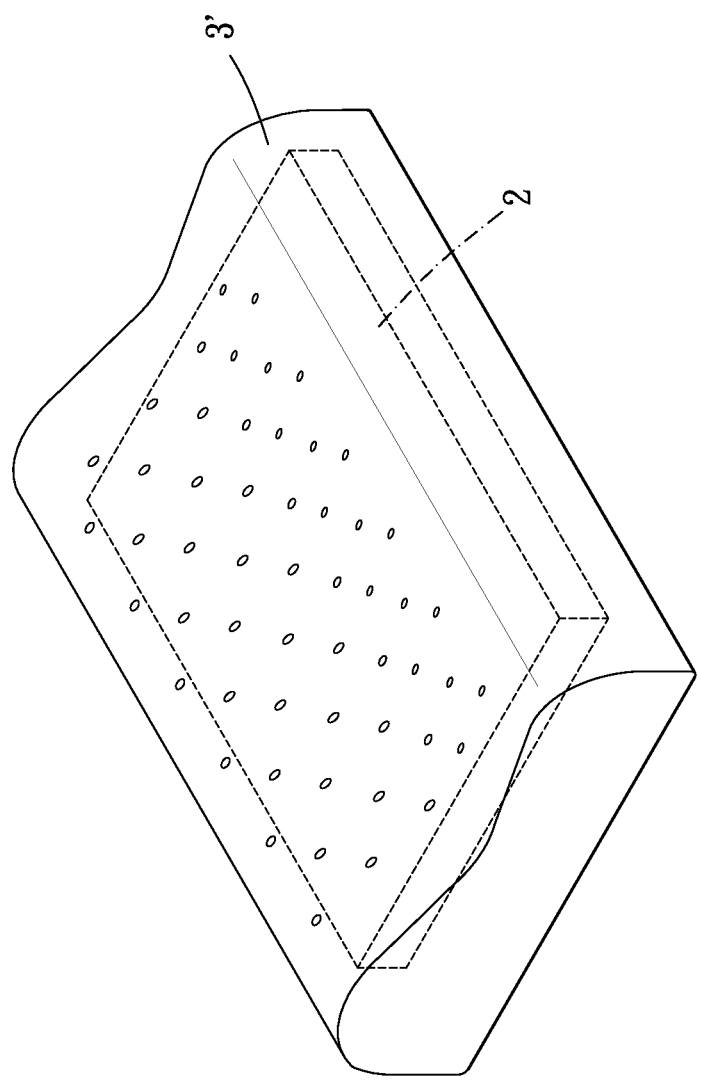
FIG. 6 is a stereogram showing a cushion composite structure of the present invention.

Fifth, the mold is stopped rotating, and the first mold body and the second mold body are removed. Thereby, the cushion composite structure is formed, as shown in FIGS. 5 and 6.

In the preferred embodiment, the mold further forms an injecting hole 112 and a relief hole 114. The injecting hole 112 is adapted for injecting more foam material when the mold has been closed. The relief hole 114 is adapted for air in the mold rooms to be discharged when the foam material is being foamed. Thus, the expanding foam material may not overflow via the gap between the first mold body and the second mold body so that parting lines on surface of the cushion composite structure is prevented. In addition, the relief hole helps guide the foam material to foam.

On the other hand, the support structures can further position the core at desired positions directly. For example, the support structures can be directly inserted into the core for positioning.

Besides, the rotating process also prevents the core from exposing outside, so value of the product is promoted.

The cushion composite structure manufactured by the previous method of the present invention, as shown in FIGS. 5 and 6, includes the core 2 and a foam layer 3'. The core 2 is embedded in the foam layer 3', and the foam layer 3' is shaped from the foam material. The compressible core is advantageous in reducing weight and providing better support.

In conclusion, due to the rotation of mold, the core can be maintained at a desired position. The support structures prevent the core from being pushed to inner surface of the mold, and the foam material is able to wrap the core and to be foamed evenly. Also, the compressible core provides better support and helps reduce weight. Furthermore, the core is compressible so that the core is able to be compressed when the foam material is being foamed. Thus, foam material is prevented from entering the gap between the mold bodies and forming parting lines.

What is claimed is:

1. A method to manufacture cushion composite structure, utilizing a mold including a first mold body and a second mold body wherein at least one of the first mold body and the second body forms a mold room, the method to manufacture cushion composite structure including steps:
   I. injecting a foam material into the mold room wherein volume of the foam material is equal to or smaller than volume of the mold room;
   II. placing a compressible core into the mold room wherein the core is shaped in advance and has a predetermined shape, wherein the compressible core floats upon the foam material;
   III. closing the first mold body with the second mold body so that the mold room is closed and the compressible core is entirely contained in the mold room;
   IV. rotating the mold along a rotation axle on the mold, and the foam material being foamed and expanded to fill the mold room up, wherein the mold continuously rotates circularly about the rotation axle, and the compressible core is maintained at substantially center of the mold;
   V. removing the first mold body and the second mold body to form the cushion composite structure;
   wherein at least one of the first mold body and the second mold body has a plurality of protruding support structures on a face facing to the other one of the first mold body and the second mold body, when the foam material is foamed, the core is prevented from being pushed onto surface of the mold room by the foam material due to the support structures.

2. The method to manufacture cushion composite structure of claim 1, wherein the mold is rotated continuously by the rotation axle, the mold is stopped rotating when foaming of the foam material is finished.

3. The method to manufacture cushion composite structure of claim 1, wherein the one of the first mold body and the second mold body having the support structures further forms at least one relief hole communicating with the mold room.

4. A method to manufacture cushion composite structure, utilizing a mold including a first mold body and a second mold body wherein at least one of the first mold body and the second body forms a mold room, the method to manufacture cushion composite structure including steps:
   I. injecting a foam material into the mold room wherein volume of the foam material is equal to or smaller than volume of the mold room;
   II. placing a compressible core into the mold room wherein the core is shaped in advance and has a predetermined shape, wherein the compressible core floats upon the foam material;
   III. closing the first mold body with the second mold body so that the mold room is closed and the compressible core is entirely contained in the mold room;
   IV. rotating the mold along a rotation axle on the mold, and the foam material being foamed and expanded to fill the mold room up, wherein the mold continuously rotates circularly about the rotation axle, and the compressible core is maintained at substantially center of the mold;
   V. removing the first mold body and the second mold body to form the cushion composite structure;
   wherein the foam material is natural latex.

5. A method to manufacture cushion composite structure, utilizing a mold including a first mold body and a second mold body wherein at least one of the first mold body and the second body forms a mold room, the method to manufacture cushion composite structure including steps:
   I. injecting a foam material into the mold room wherein volume of the foam material is equal to or smaller than volume of the mold room;
   II. placing a compressible core into the mold room wherein the core is shaped in advance and has a predetermined shape, wherein the compressible core floats upon the foam material;
   III. closing the first mold body with the second mold body so that the mold room is closed and the compressible core is entirely contained in the mold room;
   IV. rotating the mold along a rotation axle on the mold, and the foam material being foamed and expanded to fill the mold room up, wherein the mold continuously rotates circularly about the rotation axle, and the compressible core is maintained at substantially center of the mold;
   V. removing the first mold body and the second mold body to form the cushion composite structure;
   wherein the foam material is artificial latex.

6. The method to manufacture cushion composite structure of claim 5, wherein the artificial latex is PU (Polyurethane).

7. The method to manufacture cushion composite structure of claim 1, wherein the core is a sponge article.

* * * * *